(12) United States Patent
Cornell

(10) Patent No.: US 9,199,314 B1
(45) Date of Patent: Dec. 1, 2015

(54) HINGED SCREEN DOOR DRILLING TEMPLATE SYSTEM AND RELATED METHODS

(71) Applicant: Unique Home Designs, Inc., Gilbert, AZ (US)

(72) Inventor: Howell N. Cornell, Merritt Island, FL (US)

(73) Assignee: Unique Home Designs, Inc., Gilbert, AZ (US)

( * ) Notice: Subject to any disclaimer, the term of this patent is extended or adjusted under 35 U.S.C. 154(b) by 395 days.

(21) Appl. No.: 13/868,947

(22) Filed: Apr. 23, 2013

(51) Int. Cl.
  *B23B 47/28* (2006.01)
  *B23B 49/00* (2006.01)
  *E05D 11/00* (2006.01)

(52) U.S. Cl.
  CPC .............. *B23B 49/00* (2013.01); *B23B 47/28* (2013.01); *B23B 47/287* (2013.01); *B23B 2247/06* (2013.01); *E05D 11/0009* (2013.01); *Y10T 408/567* (2015.01)

(58) Field of Classification Search
  CPC .. B23B 49/00; B23B 47/287; B23B 2247/06; B23B 47/28; E05D 11/0009; Y10T 408/567
  USPC ..................................................... 408/115 R
  See application file for complete search history.

(56) References Cited

U.S. PATENT DOCUMENTS

| 5,114,285 | A  | * | 5/1992 | Brydon ..................... | 408/115 R |
| 2007/0009335 | A1 | * | 1/2007 | Brewington .............. | 408/115 R |
| 2007/0041800 | A1 | * | 2/2007 | Santos ...................... | 408/115 R |

* cited by examiner

*Primary Examiner* — Eric A Gates
*Assistant Examiner* — Paul M Janeski
(74) *Attorney, Agent, or Firm* — Booth Udall Fuller, PLC

(57) ABSTRACT

A door drilling template system that includes a body and an arm is disclosed. The body may include two opposing side walls separated by a facial wall. The body may also include one or more tracks on one of the side walls and one or more drill guide holes extending through each of the two side walls. The arm is configured to removably couple to the body at the track, and includes a striker plate template, a handle, one or more rails, and one or more supports. The striker plate template includes a plurality of striker holes that extending the striker plate. The one or more rails are shaped to slidably engaged with the one or more rails of the body. The support extends between the handle and the rail.

16 Claims, 4 Drawing Sheets

HINGED SCREEN DOOR DRILLING TEMPLATE SYSTEM AND RELATED METHODS

BACKGROUND

1. Technical Field

Aspects of this document relate generally to drilling templates for doors and door frames.

2. Background Art

Many doors, including hinged screen doors are pre-fabricated in the manufacturing process. This means that the doors are provided to the end user with all necessary hardware, drilled holes, dimensions, and framing. However, in many cases it is necessary to provide doors that are not prefabricated, such as when a manufacturer provides generic replacement doors that have not been drilled so that the hardware may be easily attached. This manufacturing may be preferred because the end user may elect either left or right handedness for the door depending on the particular application. This approach, however, also generally means that an installer or end user will be burdened with drilling the holes to attach necessary hardware such as hinges, handles, strike plates, and the like. Proper placement and spacing of the holes is important for intended use of the door, but often difficult for an end user to do.

SUMMARY

A first aspect of a hinged door drilling template system comprises a body, at least one track, and an arm. The body comprises two opposing side walls and a facial wall extending between the two opposing side walls. The at least one track is on at least one of the two opposing side walls and extends at least partially between a first end of the side wall proximate the facial wall and a terminating end opposite the first end. The arm is configured to removably couple to the body at the at least one track. The arm comprises a striker plate template comprising at least two striker holes extending through the striker plate, a handle extending perpendicular from the striker plate template, at least one rail extending from the striker plate and configured to slidably engage with the at least one track, and at least one support, the at least one support extending between the at least one coupling and the handle.

In particular implementations and embodiments, the hinged door drilling template system may comprise one or more of the following. A plurality of drill guide holes, at least one of plurality of drill guide holes positioned on a first side wall of the opposing side walls and at least one of the plurality of drill guide holes positioned on a second side wall of the opposing side walls. A plurality of guide walls, each of the plurality of guide walls surrounding a different one of the plurality of drill guide holes and extending outwardly from an exterior surface of the respective first or second side wall. The plurality of drill guide holes may comprise three drill guide holes positioned on the first side wall and three drill guide holes positioned on the second side wall, and the plurality of guide walls may comprise three guide walls extending from the exterior surface of the first side wall and three guide walls extending from the exterior surface of the second side wall. The at least one track on at least one of the two opposing side walls may comprise two tracks on the first side wall, the at least one rail may comprise two T-shaped rails, and the at least one support may comprise two supports. The two tracks may each comprise a T-shaped groove sized to house one of the two T-shaped rails when the T-shaped rails are slidably engaged with the tracks. The body may be comprised of a rigid plastic.

According to a second aspect, a door drilling template comprises a body, a plurality of drill guide holes, and a plurality of walls. The body comprises two opposing side walls, a facial wall coupled between the two opposing side walls, and a distance between the two opposing side walls substantially equal to a width of a door. At least one of the plurality of drill guide holes is positioned on a first side wall of the opposing side walls and at least one of the plurality of drill guide holes is positioned on a second side wall of the opposing side walls. Each of the plurality of guide walls may surround a different one of the plurality of drill guide holes and extend outwardly from an exterior surface of the respective first or second side wall.

In particular implementations and embodiments, the door drilling template may comprise one or more of the following. At least one track on at least on the first side wall, the at least one track extending at least partially between a first end of the first side wall proximate the facial wall and a terminating end opposite the first end. An arm configured to removably couple to the body, the arm comprising a striker plate template comprising one or more striker holes, at least one rail extending substantial perpendicular from the striker plate, the at least one rail shaped to slidably engage with the at least one track such that the striker plate and the facial wall are substantially planar when the arm is in a fully coupled position with the body. A handle extending from the striker plate template and at least one support extending between the handle and the at least one rail. The at least one track may comprise two tracks, the at least one rail may comprise two rails, and the at least one support may comprise two supports each extending between the handle and a different rail of the two rails. The two tracks may each comprise a T-shaped groove, and the two rails may comprise two T-shaped rails, each T-shaped rail slidably engage with the T-shaped groove. The plurality of drill guide holes comprise three drill guide holes on the first side wall and three drill guide holes on the second side wall. The body and the arm are comprised of a rigid plastic. The opposing side walls are partially biased towards each other.

In another aspect, a method of drilling screw holes for use with a door is contemplated. The method comprises one or more of the following: slidably mounting a body of a door drilling template over a face plate portion of a door, the body comprising two opposing side walls and a facial wall extending between the two opposing side walls. Positioning a striker plate template removably coupled to the body over a striker plate portion of a door frame. Drilling through two striker holes extending through the striker plate template into the striker plate portion of the door frame.

In particular implementations and embodiments, the method of drilling screw holes for use with a door may comprises one or more of the following. Slidably mounting the body of the door drilling template over a door hinge portion of the door, and drilling through at least two guide holes on one of the two opposing side walls into the door. Slidably coupling two rails extending from the striker plate with two tracks positioned on one of the two opposing side walls. Slidably disengaging the striker plate template from the body.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended door drilling template system and/or assembly procedures for a door drilling template system will become apparent for use with implementations of a door drilling template system from this disclosure. Accordingly, for example, although particular door drilling template systems are disclosed, such door drilling template systems and implementing components may comprise any shape, size, style, type, model, version, measurement, concentration, material, quantity, and/or the like as is known in the art for such door drilling template systems and implementing components, consistent with the intended operation of door drilling template systems.

Implementations of the disclosed devices relate to door drilling template systems and methods for using and manufacturing such systems. The systems, apparatuses, and methods disclosed herein may be used with a variety of doors, including but not limited to hinged screen doors. Although reference is made specifically to hinged screen doors in various parts of this document, it is contemplated that the systems, apparatuses, and methods are also suitable for use with any type of door with little or no modification. The various implementations may be manufactured using conventional procedures known to those of ordinary skill in the art as added to and improved upon through the procedures described here.

In some cases, hinged screen doors are pre-fabricated, that is, they are provided to an end user with all necessary hardware, drilled holes, dimensions, framing, etc. However, in many cases it is necessary to provide hinged screen doors that are not thus prefabricated, such as when a manufacturer provides generic replacement hinged screen doors that have not been drilled so that hardware may be readily attached. In some cases, this may be done so that the end user may elect either left or right handedness for the door depending on the particular application. Among other things, this allows manufacturers to be less restricted with respect to their production lines. However, this approach generally means that an installer or end user will be burdened with drilling the holes to attach necessary hardware such as hinges, handles, strike plates, etc.

Figure 3:
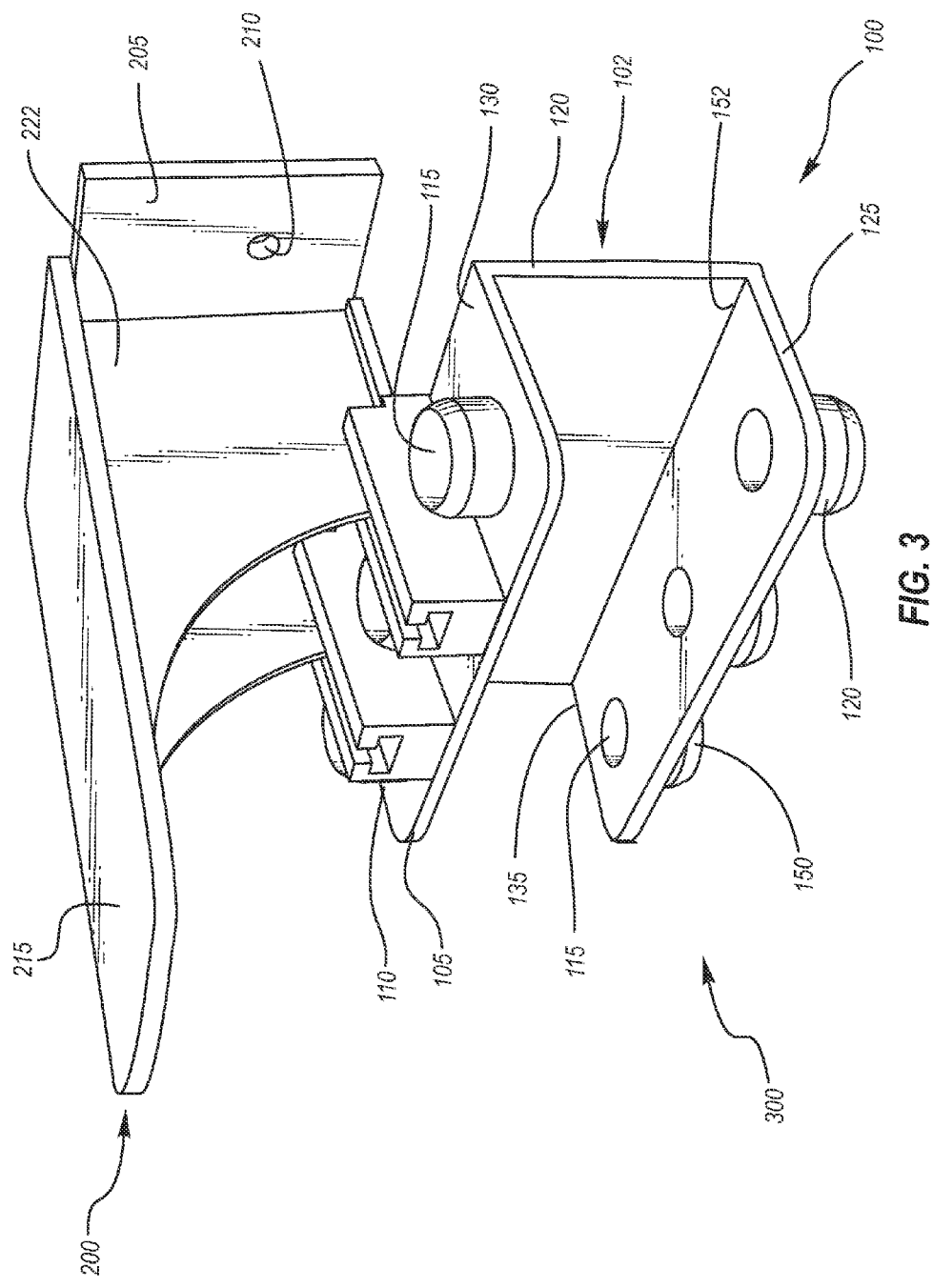
FIG. 3 is a perspective view of a door template slidably coupled to an arm.

FIG. 3 depicts a particular embodiment of a hinged door drilling template system 300. As shown in FIG. 3, an embodiment of a drilling template system 300 comprises a door template 100 and an arm 200. In a particular implementation, the door template 100 comprises a U-shaped body 102 comprising two opposing side walls 125 and a facial wall 140 separating the two opposing walls 125. Each of the two opposing side walls 125 and the facial wall 140 are typically flat, although in some implementations at least one the side walls 125 and the facial wall 140 may be curved.

Figure 1:
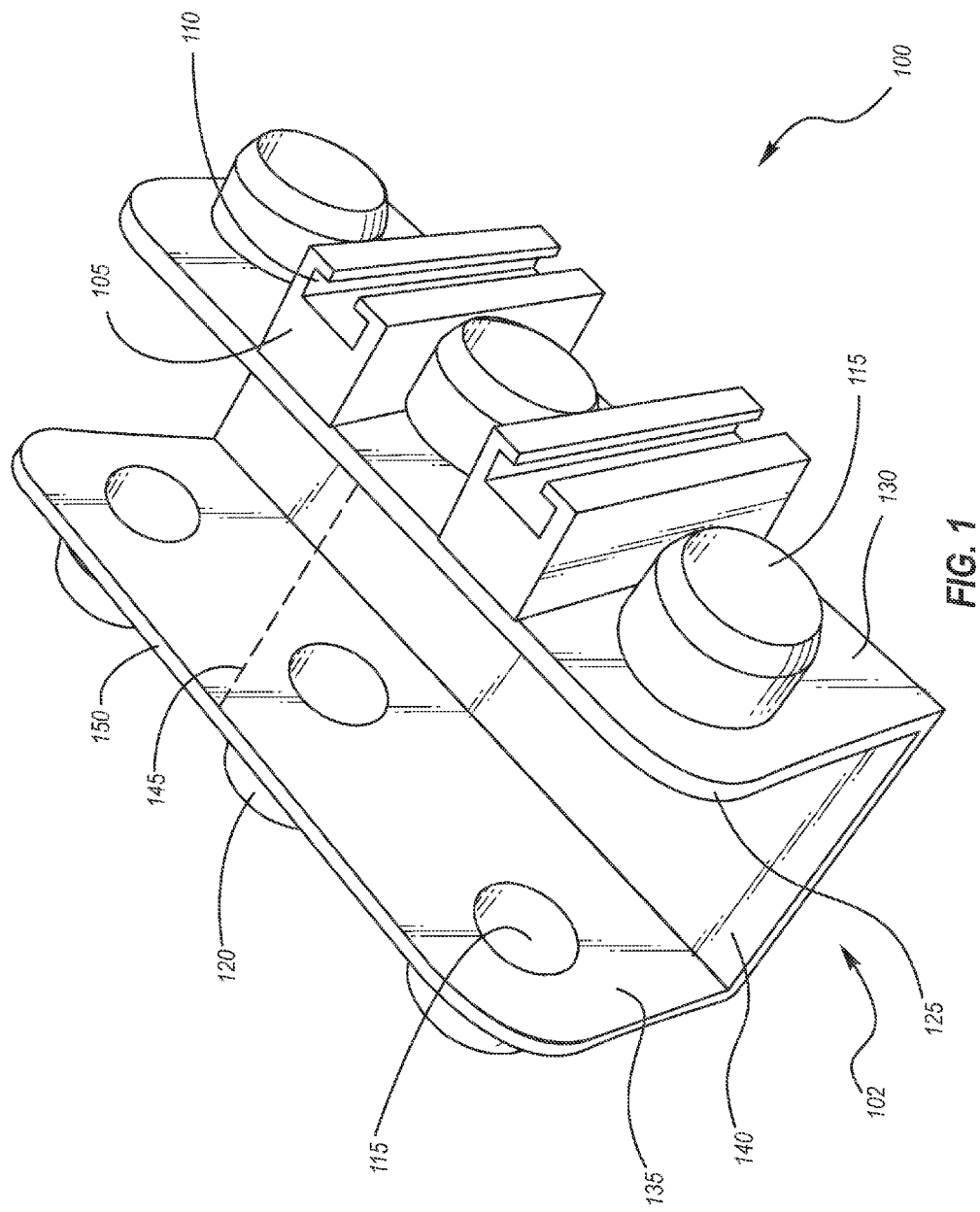
FIG. 1 is a perspective view of a door template of a hinged screen door drilling template system.
Figure 5:
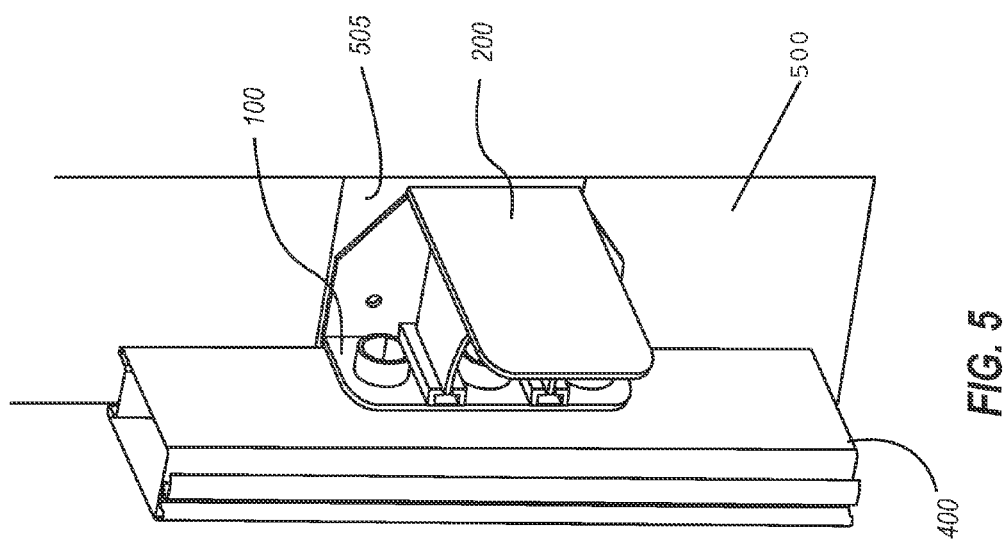
FIG. 5 is a partial perspective view of a hinged screen door drilling template system coupled to a screen door and position proximate a striker plate portion of a door frame.

As shown in FIGS. 1 and 3, the two opposing side walls 125 are slightly angled toward one another. In such an embodiment, therefore, the distance between the two opposing sidewalls 125 as measured at the first ends 152 of the side walls 125 proximate the facial wall 140 is greater than the distance 145 between the two opposing side walls 125 as measured at the terminating ends 150 of the two opposing side walls 125. This configuration allows the door template 100 to be slidably or otherwise movably mounted on a door 400 by creating opposing side walls 125 that are biased against the door 400 when the door template is slidably mounted on the door. As shown in FIG. 5 the distance between the opposing sidewalls is approximately equal to the thickness or depth of a door 400. In other embodiments, however, the two opposing side walls 125 are substantially parallel.

Some embodiments of the door template 100 further comprise a plurality of drill guide holes 115 positioned on the two opposing side walls 125, as illustrated in an exemplary embodiment shown in FIGS. 1 and 3. Each of the plurality of drill guide holes 115 extend at least partially into the exterior surface 130 of a side wall 125. As shown in the figures, the guide holes 115 may extend all the way through the side wall 125 from the exterior surface 130 through to the interior surface 135. In an embodiment, each side wall 125 of the two opposing side walls 125 comprises at least one drill guide hole 115. In the embodiment shown in FIG. 1, three drill guide holes 115 extend through a first side wall of the two opposing side walls, and three drill guide holes 115 extend through a second side wall of the two opposing side walls 125.

One or more embodiments of the of the door template further comprise at least one guide wall 120. Although not required in all embodiments, each drill guide hole 115 is typically associated with a different guide wall 120. Each guide wall 120 surrounds a different drill guide hole 115. Each guide wall 120 extends outward from the exterior surface 130 of a side wall 125. In some embodiments, the guide wall 120 comprises a cross-section shape similar to the shape of the drill guide hole 115 which it surrounds. As shown in the figures, the drill guide holes 115 are typically circular in shape, and thus the guide walls 120 are typically cylindrical in shape. The guide wall 120 each further comprising an opening extending therethrough that is aligned with the drill guide hole 115.

As previously noted, in some embodiments the door template 100 comprises three drill guide holes 115 on each side wall 125. The three drill guide holes 115 may be located in a manner that corresponds with the screw-holes of a standard door hinge. The drill guide holes 115 may be constructed such that a drill bit of a suitable diameter may penetrate a guide wall 120 so as to guide the drill through the hinged screen door 400 when the door template 100 is engaged with the door 400. In this manner, if a user utilizes the three drill guide holes 115 to drill three respective holes in the door 400, then, when the door template 100 is removed, holes will be revealed on the door 400. The holes, in such a case, would be located in a manner that would allow a standard hinge to be attached to the door 400 by way of the three holes. Different configurations of drill guide holes 115 that would correspond to different types of hinges, hinge standards, handles, strike plates, or other hardware are also contemplated.

In some embodiments, as shown in FIGS. 1, 3, and 5, the drill guide holes 115 are sufficiently rigid as to facilitate accommodating a drill bit therethrough. In some cases, this may be advantageous over, for example, paper or other non-rigid templates because the rigidity makes it more difficult for a user to err as to the location of the hole while the hole is drilled into the door 400. Furthermore, it may be important to provide such rigidity and stability since many screen doors are constructed of thin gauge metal or other similarly delicate material. Thus, providing a rigid template may facilitate the user in producing smooth, straight holes in a relatively lightweight or delicate material, without distorting or destroying the material. In some implementations, drill guide holes 115 are also provided in such a configuration that would create a suitable template for holes for a striker plate 205.

Various embodiments of the door template 100 further comprise one or more tracks 105 on at least one side wall 125. Each of the one or more tracks 105 extends at least partially between the first end 152 of the side wall 125 and the terminating end 150 of the side wall 125 opposite the first end 152. In a particular embodiment, as shown throughout the figures, the door template comprises two tracks 105 that extend all the way from the first end 152 of one side wall 125 to the terminating end 150 of the side wall 125. Other embodiments, however, may comprise any number of tracks on one more side walls 125.

Each track 105 may further comprise any groove, slot, channel, protrusion, or the like that allows the track 105 to removably couple to an arm 200. In the embodiment of FIG. 1, the track 105 comprises a T-shaped groove 110. As shall be described in greater detail below, each groove 110 is shaped complementary to the rails 220 of the arm 200, thus allowing the rails 220 to slidably engage with the grooves 110.

Figure 2:
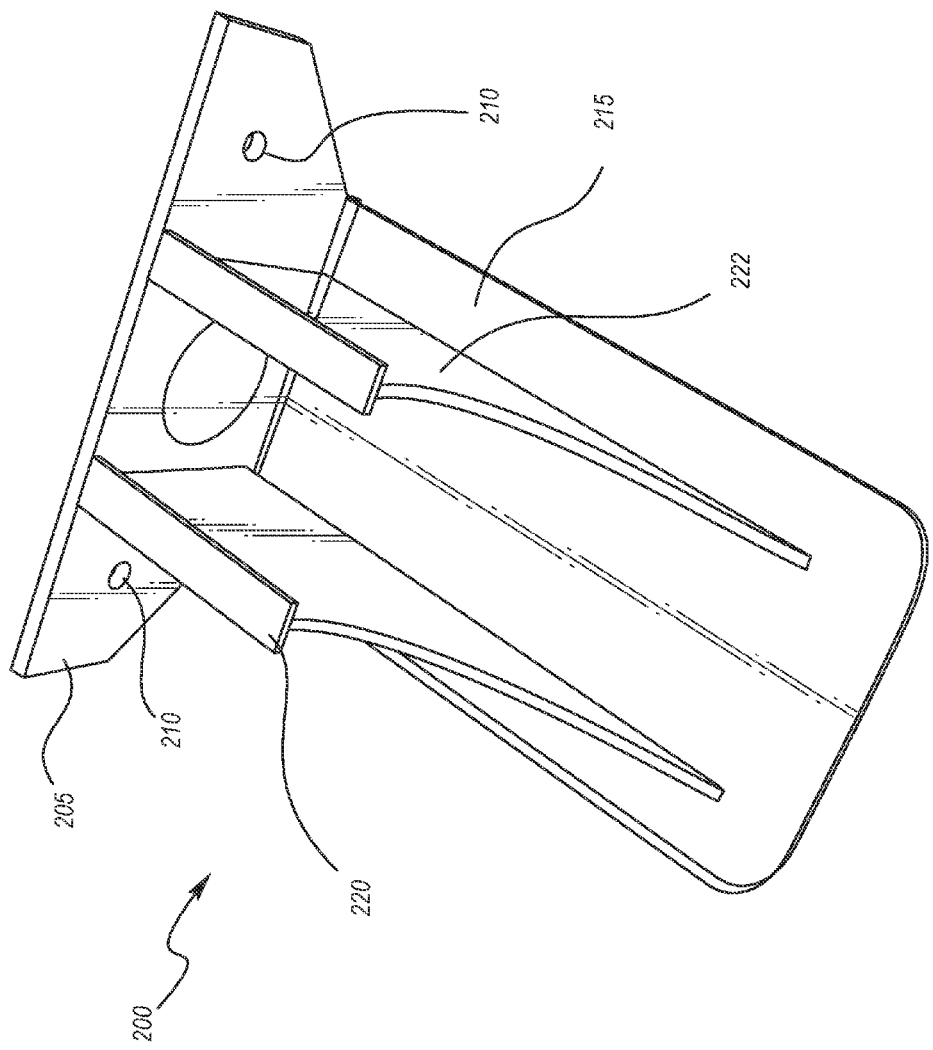
FIG. 2 is a perspective view of an arm of a hinged screen door drilling template system.

Various embodiments of the door mount 300 further comprise an arm 200. An embodiment of the arm 200 is shown in FIG. 2. An arm 200 may, for example, simulate or mimic the shape and/or size of handles or other hardware that may not be present when a user utilizes the drill guide holes 115 to drill holes in the door 400. The location of such handles or other hardware may need to be taken into consideration when determining the location of the holes to be drilled in the door 400. For example, due to the existence of some adjacent door handles or other fixtures, a hinge, handle or other hardware that is installed on the hinged screen door frame may interfere with or be hampered by such adjacent door handles or other fixtures in a way that hinders the operation or otherwise devalues the door 400 or an adjacent door. In some cases, is it not apparent to an end user or installer that he or she ought to account for such hindrances or interference, and, consequently, holes may be drilled in problematic locations on the door 400. This sometimes results in returning the drilled door 400 to a retailer for a return of credit. By providing an arm 200 that simulates general shapes and sizes of common adjacent door handles or other fixtures, the device may help an end user or installer to properly plan for an adequate drilling location on the door 400.

The arm 200 typically comprises a striker plate template 205 and one or more rails 220 extending from the striker plate template 205. The striker plate template 205 of various embodiments is shaped similar to the different striker plate portions 505 of door frames 500 known in the art. In an embodiment, the striker plate template 205 comprises a shape that resembles or complements a striker plate portion 505 of a door frame 500. The striker plate template 205 may further comprise one or more striker holes 210. In a particular embodiment, the striker plate template 205 comprises two striker holes 210 positioned near opposing ends of the striker plate template 205. The striker holes 210 typically extend through the striker plate template 205 and are positioned to align with screw holes on a striker plate.

The arm 200 further comprises one or more rails 220. The one or more rails 220 extend, usually perpendicularly, from the striker plate template 205. In an embodiment, the arm 200 comprises the same number of rails 220 as the number of tracks 105 of the door template 100. In the embodiment shown in FIG. 2, the arm 200 comprises two rails 220. The rails 220 may comprise any shape that suitable for slidably engaging with the tracks 105. In a particular embodiment, the rails 220 are T-shaped rails 220 that fit within the T-shape grooves 110 of the tracks 105.

Although not required, the rails 220 may comprise a length equal to the length of the tracks 105. The rails 220 are configured to allow the arm 200 to removably couple to the door template 100 by slidably engaging the rails with the grooves 110 of the tracks 105. In some embodiments, the arm 200 and the door template are in a fully coupled position when the rails 220 are entirely within the grooves 110 of the tracks 105, and the striker plate template 205 is substantially planar with the facial wall 140 of the door template 100.

One or more embodiments of the arm 200 further comprise one support 222 for each rail 220 and a handle 215. The handle 215 typically extends substantially perpendicular from a side of the striker plate template opposite the rails 220. Each support 222 is configured to support one rail 220. In some embodiments, the support 222 comprises a wall that extends between the striker plate template 205, the rail 220, and the handle 215. Embodiments may further comprise a curved side on the support 220 that extends beyond the end of the rail 220 towards the end of the handle 215.

In some cases, providing an arm 200 that is repeatedly detachable from the body 102 allows for such devices to be more easily shipped together with replacement doors 400 without being too bulky. For example, some packages for hinged screen doors may be roughly one to three inches thick. In order to avoid needing a thicker package to ship such a device together with a replacement hinged screen door, detaching the arm portion from the body portion creates a smaller profile that would fit within existing package dimensions.

In still more cases, providing an arm 200 portion that is repeatedly detachable from the body 100 portion allows an end user or installer to access the inside portion of the drill guides. This may be advantageous in some cases where it is not possible or desirable to drill holes completely through the hinged screen door frame from the exterior side. In such cases, removing the arm portion provides access so that holes may be easily drilled from the inside.

Figure 4:
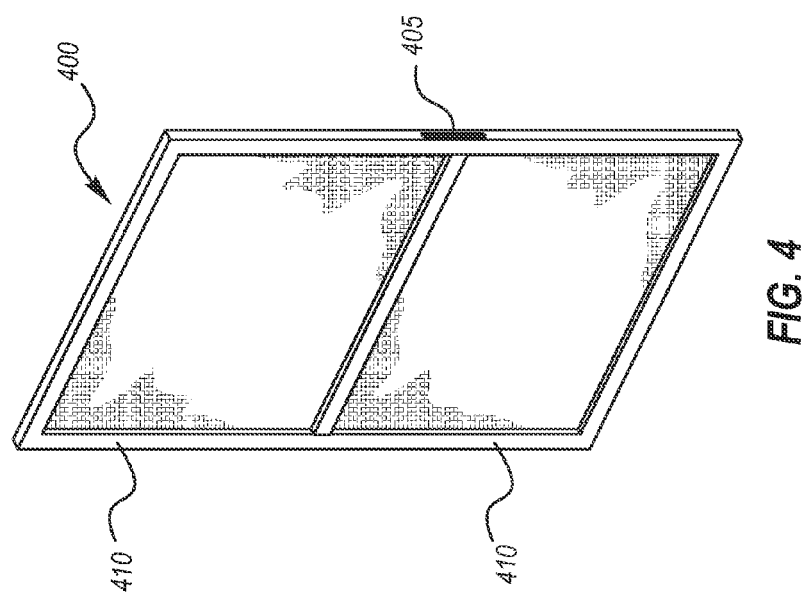
FIG. 4 is a perspective view of a screen door.

Contemplated in the disclosures presented herein is a method of drilling screw holes for use with a door 400 similar to the door shown in FIG. 4. In one or more embodiments, the method comprises slidably mounting a body 102 of a door template 100 over a face plate portion 405 of a door 400. FIG. 5 illustrates an embodiment of the door template 100 covering at least a portion of the face plate portion 405 (not visible). The body 102 may comprise any embodiments of a body 102 previously described herein. In a particular embodiment, the body 102 comprises two opposing side walls 125 and a facie wall 140 extending between the two opposing side walls 125.

In one or more embodiments, the method further comprises positioning a striker plate template 205 removably coupled to the body 102 over a striker plate portion 505 of a door frame 500. The method may further comprise drilling through two striker holes 210 extending through the striker plate template 205 into the striker plate portion 505 of the door frame 500.

In one or more embodiments, the method further comprises slidably mounting the body 102 of the door template 100 over a hinge portion 410 of a door 400. The method may further comprise drilling through at least two guide holes on one of the two opposing side walls and into the door.

In one or more embodiments, the method further comprises slidably coupling two rails 220 extending from the striker plate template 205 with two tracks 105 positioned on one of the two opposing side walls 125. At any point during the method, the striker plate template 205 may be slidably disengaged from the body 102.

It will be understood that implementations are not limited to the specific components disclosed herein, as virtually any components consistent with the intended operation of a method and/or system implementation for door drilling template systems may be utilized. Accordingly, for example, although particular door drilling template systems may be disclosed, such components may comprise any shape, size, style, type, model, version, class, grade, measurement, concentration, material, weight, quantity, and/or the like consistent with the intended operation of a method and/or system implementation for a door drilling template system may be used.

In places where the description above refers to particular implementations of door drilling template systems, it should be readily apparent that a number of modifications may be made without departing from the spirit thereof and that these implementations may be applied to other door drilling template system. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A hinged door drilling template system, comprising:
a body comprising two opposing side walls and a facial wall extending between the two opposing side walls;
at least one track on at least one of the two opposing side walls, the at least one track extending at least partially between a first end of the side wall proximate the facial wall and a terminating end opposite the first end; and
an arm configured to removably couple to the body at the at least one track, the arm comprising a striker plate template comprising at least two striker holes extending through the striker plate, a handle extending perpendicular from the striker plate template, at least one rail extending from the striker plate and configured to slidably engage with the at least one track, and at least one support, the at least one support extending between the at least one coupling and the handle.

2. The hinged door drilling template system of claim 1, further comprising a plurality of drill guide holes, at least one of plurality of drill guide holes positioned on a first side wall of the opposing side walls and at least one of the plurality of drill guide holes positioned on a second side wall of the opposing side walls.

3. The hinged door drilling template system of claim 2, further comprising a plurality of guide walls, each of the plurality of guide walls surrounding a different one of the plurality of drill guide holes and extending outwardly from an exterior surface of the respective first or second side wall.

4. The hinged door drilling template system of claim 3, wherein the plurality of drill guide holes comprises three drill guide holes positioned on the first side wall and three drill guide holes positioned on the second side wall, and wherein the plurality of guide walls comprises three guide walls extending from the exterior surface of the first side wall and three guide walls extending from the exterior surface of the second side wall.

5. The hinged door drilling template system of claim 4, wherein the at least one track on at least one of the two opposing side walls comprises two tracks on the first side wall, the at least one rail comprises two T-shaped rails, and the at least one support comprises two supports.

6. The hinged door drilling template system of claim 5, wherein the two tracks each comprise a T-shaped groove sized to house one of the two T-shaped rails when the T-shaped rails are slidably engaged with the tracks.

7. The hinged door drilling template of claim 6, wherein the body is comprised of a rigid plastic.

8. A door drilling template, comprising:
- a body comprising two opposing side walls, a facial wall coupled between the two opposing side walls, and a distance between the two opposing side walls substantially equal to a width of a door;
- a plurality of drill guide holes, at least one of the plurality of drill guide holes positioned on a first side wall of the opposing side walls and at least one of the plurality of drill guide holes positioned on a second side wall of the opposing side walls;
- a plurality of guide walls, each of the plurality of guide walls surrounding a different one of the plurality of drill guide holes and extending outwardly from an exterior surface of the respective first or second side wall;
- at least one track on at least on the first side wall, the at least one track extending at least partially between a first end of the first side wall proximate the facial wall and a terminating end opposite the first end; and
- an arm configured to removably couple to the body, the arm comprising a striker plate template comprising one or more striker holes, at least one rail extending substantial perpendicular from the striker plate, the at least one rail shaped to slidably engage with the at least one track such that the striker plate and the facial wall are substantially planar when the arm is in a fully coupled position with the body.

9. The door drilling template of claim 8, further comprising:
- a handle extending from the striker plate template; and
- at least one support extending between the handle and the at least one rail.

10. The door drilling template of claim 9, wherein the at least one track comprises two tracks, the at least one rail comprises two rails, and the at least one support comprises two supports each extending between the handle and a different rail of the two rails.

11. The door drilling template of claim 10, wherein the two tracks each comprise a T-shaped groove, and the two rails comprise two T-shaped rails, each T-shaped rail slidably engage with the T-shaped groove.

12. The door drilling template of claim 11, wherein the plurality of drill guide holes comprise three drill guide holes on the first side wall and three drill guide holes on the second side wall.

13. The door drilling template of claim 12, wherein the body and the arm are comprised of a rigid plastic.

14. The door drilling template of claim 8, wherein the opposing side walls are partially biased towards each other.

15. A method of drilling screw holes for use with a door, comprising:
- slidably mounting a body of a door drilling template over a face plate portion of a door, the body comprising two opposing side walls and a facial wall extending between the two opposing side walls;
- slidably coupling two rails extending from a striker plate with two tracks positioned on one of the two opposing side walls;
- positioning the striker plate template removably coupled to the body over a striker plate portion of a door frame;
- drilling through two striker holes extending through the striker plate template into the striker plate portion of the door frame;
- slidably mounting the body of the door drilling template over a door hinge portion of the door; and
- drilling through at least two guide holes on one of the two opposing side walls into the door.

16. The method of claim 15, further comprising slidably disengaging the striker plate template from the body.

* * * * *